Feb. 21, 1961 W. P. DUBBS 2,972,428
TAPE APPLICATOR
Filed Jan. 19, 1959 3 Sheets-Sheet 2
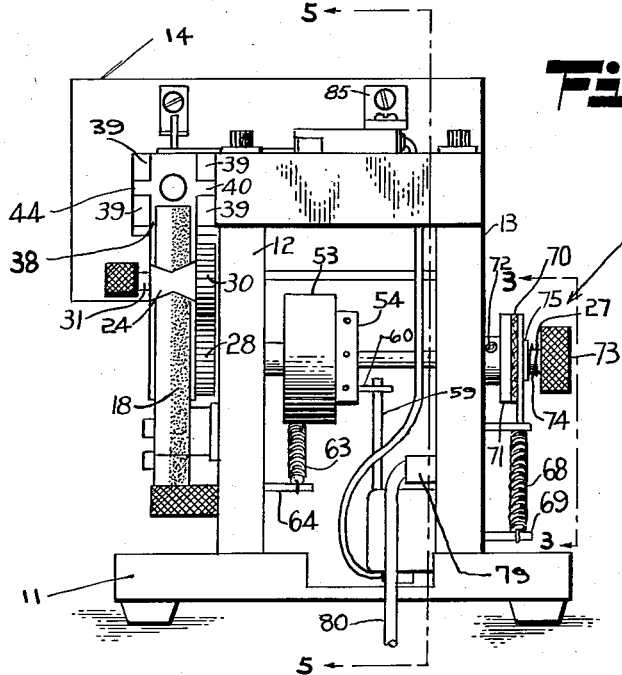
Fig_2_
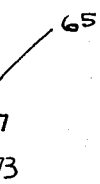
Fig_3_
Fig_4_
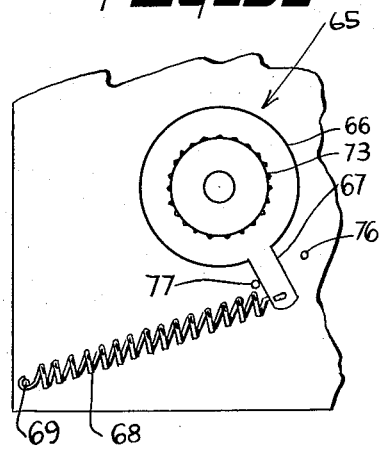
INVENTOR
WENDELL P. DUBBS
BY
ATTORNEY

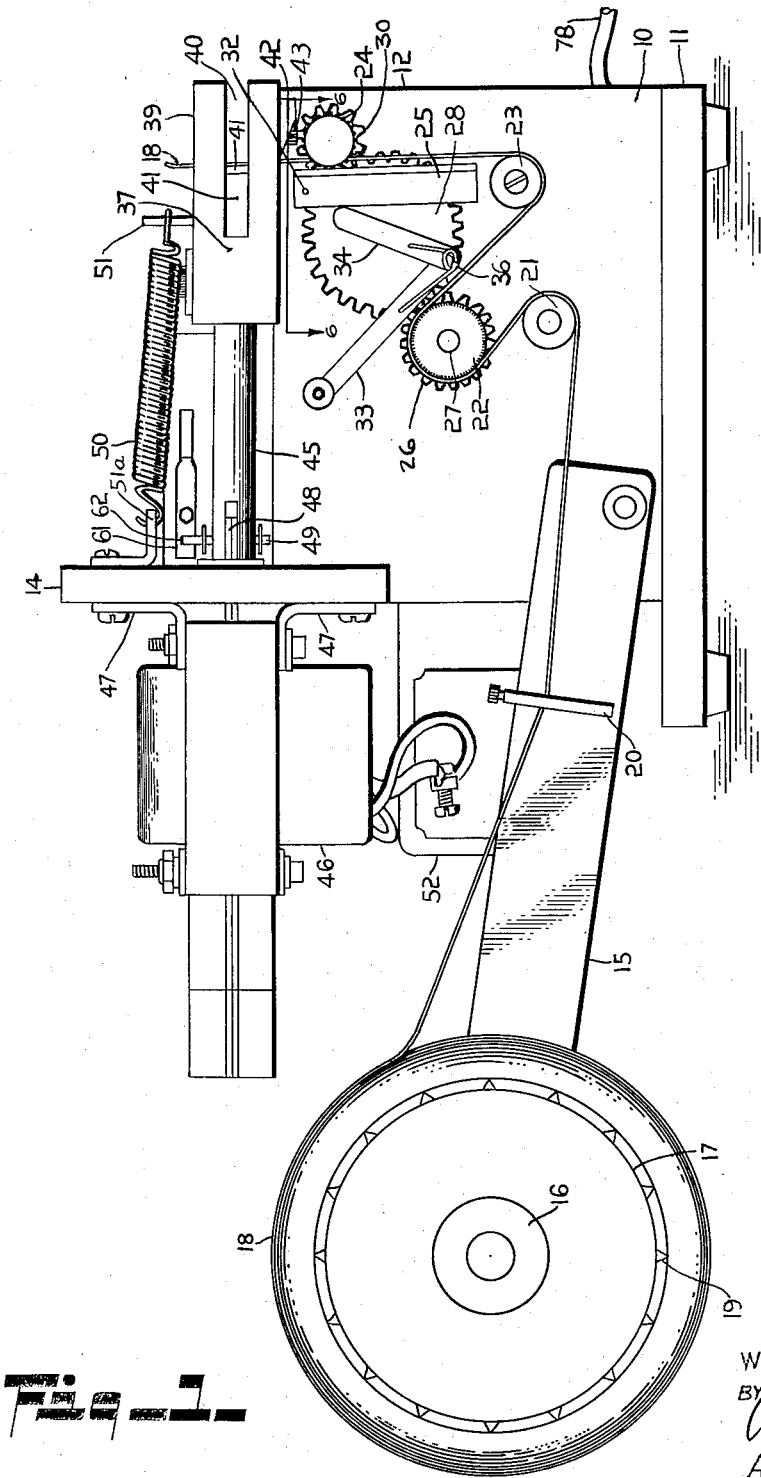

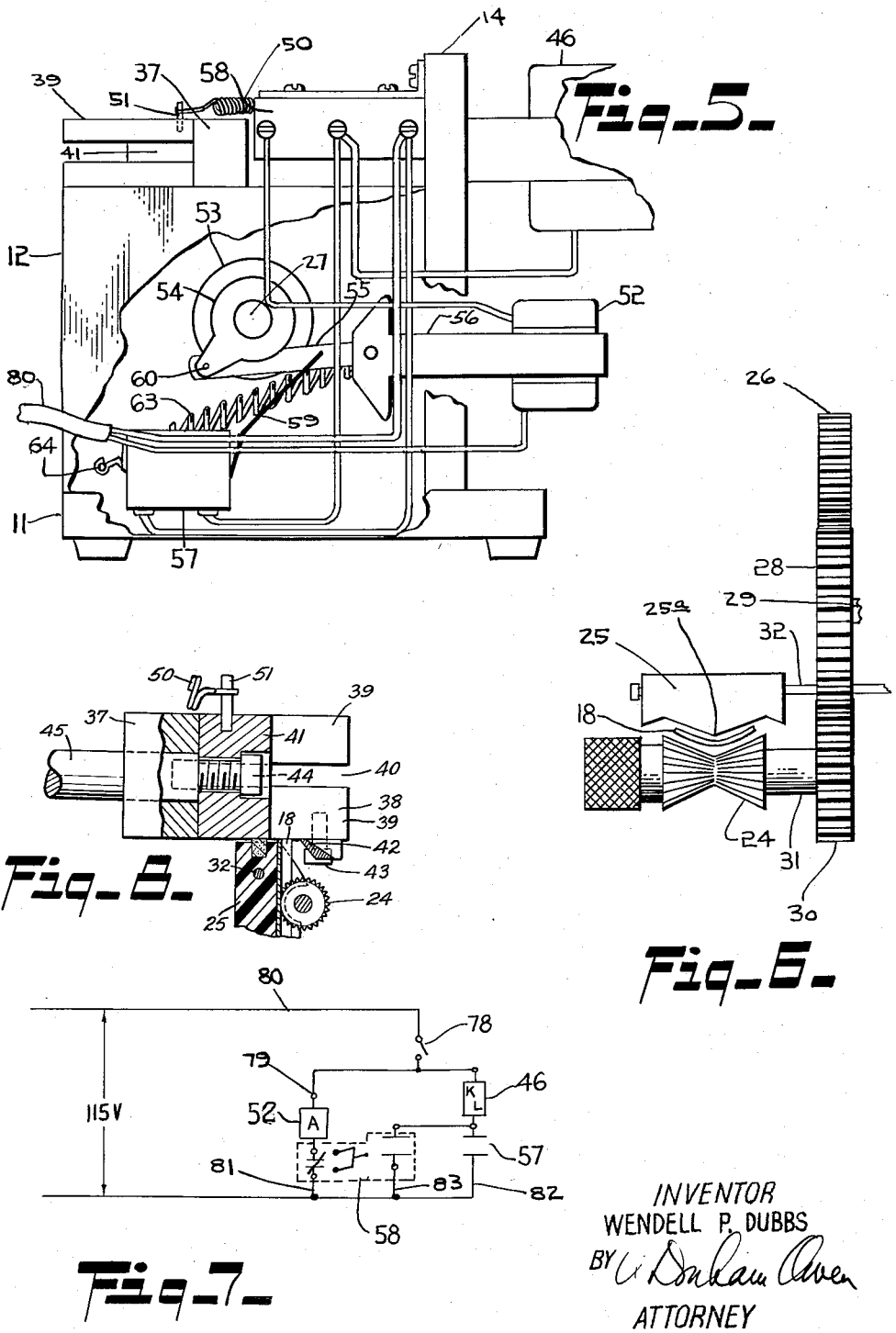

United States Patent Office 2,972,428
Patented Feb. 21, 1961

2,972,428

TAPE APPLICATOR

Wendell P. Dubbs, Palo Alto, Calif., assignor to Cellotape & Tag Printers, Palo Alto, Calif., a corporation of California Filed Jan. 19, 1959, Ser. No. 787,550

11 Claims. (Cl. 216—25)

This invention relates to tape dispensing and applicating devices. More particularly, it relates to tape dispensing machines of a type adapted to automatically apply segments of pressure-sensitive adhesive tape to a surface, at an extremely rapid rate.

In the manufacturing industry, and particularly in those areas involved with the packaging, shipping and handling of merchandise, a multitude of products moving along a production line often are required to be marked for identification as to content, date, price, etc. It has become highly advantageous as a means of fulfilling this requirement, to employ pressure-sensitive adhesive tape which has been pre-printed with the appropriate coded information and is then applied by some means to the article to be marked. The present invention provides a highly compact and efficient mechanism for performing the tape dispensing and application operation, which is readily adaptable for code marking.

Other uses for such tape dispensers have been found, where it is necessary to apply portions of tape for sealing as well as marking. The present invention is sufficiently broad in its concept and application to encompass a large area of the tape dispensing field, since the problems therein may find their solution in one of the many forms of my device, as disclosed in the following specification and drawings.

The basic tape dispensing problem resolves itself into one of providing means to rapidly remove the tape from a given supply and convey it in the desired size from the supply source to the point of application on the package being served, where it must be placed with the proper amount of pressure to assure its adherence thereto. The nature of a tacky-surfaced, pressure-sensitive tape requires that it be forcefully removed from its source of supply and positively advanced in such a manner that it may be severed in the same prescribed lengths on each cycle. Thus, it is necessary to provide a positive acting yet highly reliable machine which can perform the aforesaid operations and yet be simple and durable and thus capable of sustained operation. It is also necessary that, to be practical, the device for applying the tape segments be fully automatic and capable of completely unattended operation in a variety of package-conveying production line arrangements.

It is, therefore, the principal object of the present invention to provide an improved and highly efficient machine for automatically and rapidly applying predetermined lengths of pressure-sensitive adhesive tape to prescribed articles.

A further object of the invention is to provide a tape-dispensing machine which is simple and relatively inexpensive to manufacture, yet highly reliable and easy to operate.

More specifically, the object of the present invention is to provide a solenoid-actuated pressure-sensitive tape dispenser and applicator having a driving means which removes the tape from a supply source and advances it, and also a combination knife and ram which severs the predetermined lengths of tape and then carries them up against package surfaces to apply the tacky side of the tape to the packages.

The basic principle underlying an important feature of novelty of my improved machine is the utilization of electrical solenoids to provide the driving power to perform the various operations of the tape-dispensing and applicating process. The use of solenoids, together with the unique actuating structure consisting of switches which energizes the solenoids in a novel and efficient sequence, provides a simple yet reliable operation of the device. Therefore, another object of my invention is to provide a solenoid-operated tape dispenser having a circuitry which energizes the solenoids in a prescribed sequence which assures that the tape will be advanced before the cut-off means is actuated.

Another object of the present invention is to maintain smooth operation of my tape-dispensing device by providing the solution for the problem wherein the tacky side of the tape tends to stick to parts of the machine after a cycle, thus impeding the smooth passage of the tape into position. Each cycle of tape movement includes a small amount of direction reversal, to pull the tape away from any parts of the device which would keep it from advancing properly, such as the knife or ram.

Another object of my invention is to provide a sequencing arrangement which controls the solenoids so that the knife solenoid will be released before the tape is retracted, at the end of each cycle.

These and other features are fully disclosed in the following description of my invention.

It is obvious, of course, that my tape-dispensing device may have many different forms and applications, involving the dispensing of tape, and that many variations will present themselves to those skilled in the art, within the scope of the invention.

One form which the invention may assume is exemplified in the following description, and illustrated by way of example in the accompanying drawings, in which:

Fig. 1 is a view in side elevation of the machine embodying the preferred form of my invention;

Fig. 2 is a view in front elevation of the machine showing additional features;

Fig. 3 is a fragmentary end view showing the details of the slip clutch;

Fig. 4 is a plan view of the device;

Fig. 5 shows a sectional end view taken through the section lines shown in Fig. 2;

Fig. 6 is a fragmentary plan view taken through the section lines shown in Fig. 1, showing details of the feed means;

Fig. 7 is an electrical diagram of the system.

Fig. 8 is an enlarged fragmentary view in elevation and in section showing the ram knifehead in its retracted position.

Broadly speaking, my invention is directed to a novel tape dispensing device which utilizes simple components in conjunction with an efficient and unique control system which advances, severs, and applies a segment of pressure-sensitive tape. In essence, the present invention consists of a solenoid 52 which drives the tape 18 by means of a knurled advancing-roller 22 and thence through a feed means 24, 25 and up into a slot 38 where it is severed by ram 41 which moves the tape against knife 42. The ram 41 is driven by a second solenoid 46. A first microswitch 57 and a second microswitch 58 are arranged to be actuated by the movements of the shaft 55 and the ram 41. The switch 57 is connected to solenoids 46 and 52. Therefore, when current flows through solenoid 52 and switch 58 the solenoids 52 actuates to move shaft 55 and rotate the tape-driving wheel 22 as will be explained later. At the end of the driving stroke, pin 60 on shaft 55 actuates lever 59 to close switch 57 and energize the solenoid 46 and the reciprocating ram 41 through switch 58. Thus the cut-off operation cannot take place until the tape has been advanced. When the ram 41 completes its stroke as will be explained later it actuates a similar lever 61 which, in turn, releases solenoid 52 which returns to its original position. Again, the novel control arrangement assures that the cut-off stroke is made before the advancing solenoid 52 retracts. Another important novel feature of my invention is the use of a slip clutch means 65 to retract the tape 18 slightly, following the retraction of the shaft 55 on the advancing solenoid 52. This action eliminates the tendency of the tape to stick on the knife-edge 42 following the severing stroke.

Referring now to the drawings, wherein is illustrated a preferred embodiment of my invention, Fig. 1 shows a support frame 10 mounted on base 11, which could be any convenient rigid structure. It is obvious that the frame 10 could be fashioned in any number of different shapes, to fulfill its purpose. In the frame structure shown, parallel frame members 12, 13 are made from rigid metal plate stock and are identical in shape. Parallel frame members 12, 13 are fixed at right angles to the back frame member 14, and attached firmly to base 11. Extending rearward of parallel frame member 12 and attached thereto is drum-supporting arm 15. Mounted on drum-supporting arm 15 by shaft 16 is tape-drum 17, on which is fixed a supply of rolled, presure-sensitive tape 18. Tape drum 17 is knurled or scored to form projections 19 which prevent the roll of tape 18 from slipping on the drum 17. As the tape 18 is unrolled from the drum 17, it passes under tape guide 20 and around roller guide 21, passing over the knurled driving roller 22, thence around roller guide 23 and upward to pass between feeding wheel 24 and guide chute 25. The feeding wheel 24 (shown in greater detail in Fig. 6) has a V-shaped indentation which is knurled to reduce sticking to the adhesive side of the tape. Feeding wheel 24 is gear-driven by connected driving gear 26 on the driving roller shaft 27, which drives pinion 28 mounted on shaft 29, which meshes with gear 30 attached to shaft 31 along with feed-wheel 24. Shafts 27, 29, and 30, along with roller guides 21 and 23, are mounted in frame member 12. The guide chute 25 is pivotally mounted about pin 32 and has a V-shaped ridge 25a extending the length thereof, which acts to shape the tape as it passes over the ridge 25a and to press the tape inwardly against feed-wheel 24, causing the tape to bend about its own longitudinal axis as the feed-wheel 24 rotates, thereby giving increased stiffness to the tape so that it can be thrust upward positively for the cutting stroke. Rod 33 fixedly attached to frame member 12 is connected to movable arm 34 which bears against the rear of guide chute 25 and is spring-loaded by spring member 36 to cause guide chute 25 to press the tape firmly against the feed wheel 24.

Mounted on top of parallel frame members 12, 13 is knife guideway 37, having slot 38 to receive the tape as it moves upward prior to being cut off. The guideway 37 is made up of four parallel prong members 39 between which are formed guiding slots 40. Slots 40 and the knife guideway 37 are adapted to receive mating projections 44 on a ram knifehead 41. Attached to the underside of the guideway 37 is knifeblade 42, held in place by set-screw 43. The combination ram-knifehead 41, having rectangular protrusions 44 which mate with guideway slots 40, is connected by shaft 45 to the solenoid 46. The solenoid 46 is attached by brackets 47 to the back frame member 14, where a reciprocating rod member 48 extends through the back member 14 to be attached by pin 49 to reciprocating shaft 45. Retract spring 50 is attached at one end to pin 51 which is fixed on the ramhead 41 and at the other end is attached by a bracket 51a to the back frame member 14.

In Fig. 8 an enlarged view is shown of the ram-knifehead 41 and the fixed knifeblade 42 with the adjoining tape guide chute 25 and feed wheel 24. Here can be readily seen how the tape 18 is extended upward between the ram-knifehead 41 and the knifeblade 42 just before the ram-knifehead 41 is thrust forward (from left to right) to pass over the knifeblade 42 to sever the tape 18 in a quick clean stroke.

The tape advancing solenoid 52, which also is attached to the back frame member 14 (and more clearly shown in Fig. 5) comprises the driving means for the knurled driving roller 22. Shaft 27 of the knurled driving roller 22 extends through the parallel frame members 12, 13. Between said parallel frame members 12, 13 and connected to said driving shaft 27 is an over-running clutch assembly 53 which acts as a ratchet and permits rotation of shaft 27 in one direction. Driving the clutch assembly 53 is driving-wheel 54, which is connected by rod 55 to the reciprocating solenoid-actuator 56. Thus, as viewed in Fig. 5, as actuator 56 moves to the right the over-running clutch 53 causes the shaft 27 to rotate counterclockwise, advancing tape 18. Microswitch 57 is attached to the base 11 and electrically connected in parallel with microswitch 58, which is mounted by means of a bracket 85 to back frame member 14. A tripping lever 59 is attached to microswitch 57 and is actuated by a pin 60 which extends from connection between rod 55 and actuator 56 and is of sufficient length to engage pivoting switch 59 to control microswitch 57 when actuator 56 reaches the end of its power stroke. Similarly, on microswitch 58 there is a tripping lever 61 which extends outwardly from microswitch 58 to be engaged by pin 62 mounted on reciprocating ram shaft 45.

Returning to the driving mechanism, drive shaft return-spring 63 is attached to the reciprocating shaft 56 at one end, and at the other end attached to the frame member 12 by pin 64 so that, with no power in the solenoid 52, the shaft member 56 is moved by spring 63 to the left, as viewed in Fig. 5. At the outer end of drive shaft 27 adjacent to frame member 13 is slip-clutch 65 (shown in Fig. 3) comprising a pressure member 66 which may be made of some rigid material such as brass, having an arm 67 which is attached by spring 68 to frame member 13 at pin 69. Immediately adjacent member 66 is friction washer member 70, which may be made from cork or some equivalent material, which is adjacent flange member 71 attached by set-screw 72 to the shaft 27. Knurled nut 73 attached at the end of shaft 27 retains spring member 74, which presses on washer 75 to provide pressure of member 66 against friction washer 70, so that the slip clutch 65 turns with shaft 27. Pins 76 and 77 are attached to frame member 13 to restrict the travel of arm 67. When arm 67 is driven against pin 76 by the driving force exerted on shaft 27 by the solenoid 52, spring 68 is loaded and the clutch 65 slips with the remainder of the power stroke. Thus, when the power to the solenoid is released, the clutch 65 will again engage the shaft 27 and rotate back against pin 77 by virtue of the spring force of spring 68. This backward movement of the shaft 27 causes the tape 18 to retract a small distance, which is sufficient to remove the tape 18 from the knife 42.

While I have confined the detailed description of my invention to the preferred embodiment thereof, it is obvious that many modifications may occur to those skilled in the art which would fall within the scope of the invention. For example, it would be feasible to employ electrically controlled pneumatic power means to drive the tape-advancing roller 21 and the reciprocating ram 41, although I prefer to use solenoids.

Fig. 7 of the drawings is an electrical schematic, diagram illustrating the novel arrangement of the microswitches 57 and 58 which actuate the solenoids 46 and 52 so as to provide the desired sequence of operations. These solenoids and the microswitches employed in the circuitry are standard components adapted to be operable in simple 115-volt systems. The system is adaptable to be energized either by a manual pushbutton-actuated switch, an electric-eye actuating switch which can signal the device from a remote position, or a switch located directly on the device and timed to actuate at predetermined intervals.

The explanation of Fig. 7 can best be made by reviewing the operation of the device wherein switch 78 is closed by one of the aforementioned energizing means as, for example, an electric eye located on a packaging machine or on a production line which senses exactly when the package is in position to be marked. As switch 78 is closed, the current flows to the inlet junctions 79 of the tape dispenser and supplies current through inlet line 80 and the solenoids 46 and 52 connected in parallel. The tape-advance solenoid 52 is connected to double-pole microswitch 58 and at the beginning of a cycle the circuit 81 is closed to the advance-solenoid 52 and the switch 58, so that current flows through solenoid 52 and it becomes energized to actuate shaft 56 and drive shaft 27 to advance the tape. As shaft 56 completes its travel, pin 60 engages tripping lever 59 on microswitch 57. Single-pole microswitch 57 in circuit 82 is thus closed and energizes knife-solenoid 46 which causes the ram 41 to advance and cut off a section of tape 18 which has been thrust up into slot 38. It is an important feature of my invention that the novel sequence of operations of the solenoids 46 and 52, as stated above, assure that the knife-solenoid 46 cannot close until the advance-solenoid 52 is actuated to advance the tape 18 into the cut-off position, since the switch to close the knife-solenoid circuit is actuated at the end of the stroke of the advance-solenoid 52.

The travel of the ram 41 of the knife-solenoid 46, which severs the tape and applies it to the desired surface, causes pin 62 to engage and to trip lever 61 on microswitch 58. This action opens the circuit 81 through advance-solenoid 52 so that shaft 56 will be returned to its original position by spring 63. As rod 55, connected to shaft 56, moves under the force of spring 63, pin 60 disengages lever 59 which opens the circuit 82 through the ram-solenoid 46. However, the tripping of lever 61 on microswitch 58 by pin 62 as the ram 41 completed its cut-off stroke, which opened circuit 81, also closed the circuit 83 through the microswitch 58 and the ram-solenoid 46, so the ram 41 remains in its extended position until the cycling switch 78 is opened and current ceases to flow, whence retract-spring 50 returns ram 41 to its starting position. Thus the machine is adapted to cycle upon a pulse of current as switch 78 is opened and closed by one of the afore-mentioned means. It is again important to note the novel sequence of operation of the elements, in that the retraction of tape 18 cannot take place until the tape has been cut off by the knife-solenoid 46.

With regard to the retraction of the tape 18, which is an important feature of the present invention, the reciprocating shaft 56, when energized by solenoid 52, causes spring 68 on the slip clutch 65 on shaft 27 to be loaded as arm 67 is forced against pin 76. Thus, upon the release of torque on driving shaft 27 exerted by shaft 56 through over-running clutch 53, the slip clutch 65, by virtue of its friction lock on flange 71, causes shaft 27 to turn backward, or counterclockwise as viewed in Fig. 1, the amount equivalent to the travel of arm 67 from pin 76 to pin 77. This retraction stroke, which turns the driver 22 backwards, pulls the end tape 18 backward from the cut-off knife 42 and frees it for the next advancing cycle.

As may be seen from the foregoing description of my novel tape dispenser and applicator, I have disclosed a highly useful device which may have wide scope of utility. My device is by no means limited to a stationary installation and may readily be incorporated as a hand-held portable machine.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A device for severing and applying to a surface segments of pressure-sensitive tape of the type having a tacky side and a printed opposite side, comprising: a frame, a supply of tape, a knurled rotatable driving means engaging the tacky side of the tape and adapted to advance said tape from said tape supply, feeding means adjacent said driving means and mechanically connected thereto to propel said tape upward into a slot, reciprocating ram means adapted to pass over knife means on said frame to sever a segment of said tape and to press said tape against a surface, spring means attached to said ram and said frame normally holding said ram in its retracted position; a drive shaft mounted on said frame connected to and driving said rotatable driving means, over-running clutch means on said drive shaft, a reciprocating shaft connected to said over-running clutch, said reciprocating shaft having a spring normally urging it into the retracted position, means to drive said clutch and said drive shaft, comprising a first solenoid mounted on said frame and adapted to move said reciprocating shaft; a first switch on said frame, lever means controlling said switch, pin means associated with said reciprocating shaft to engage said lever means whereby said switch is actuated; said first switch being connected to and controlling a second switch, said second switch also connected to a first solenoid and second solenoid, said second solenoid connected to and providing power to move said reciprocating ram means, said second switch means adjacent said reciprocating ram, actuating means attached to said second switch, said actuating means engageable by pin means on said reciprocating ram near the end of its stroke to reverse said second switch; and a source of electrical power connected to said first solenoid and said second switch, whereby power through said first solenoid drives the tape into position into said slot before the second solenoid is energized to drive the reciprocating ram to cut off the tape.

2. The device set forth in claim 1 including slip clutch means mounted on said drive shaft, comprising a flanged member secured to said drive shaft, a frictional washer adjacent said flange on said drive shaft, a spring-loaded pressure member on said drive shaft adapted to press said frictional washer against said flange member with a predetermined force, said pressure member having an arm extending therefrom having a retract spring attached thereto, said retract spring being attached at its other end to the frame, pin means on said frame to limit the travel of said arm, whereby said arm is moved by the rotation of said drive shaft against a pin stop during a portion of the driving stroke loading said retract spring and causing relative movement between said frictional washer and said flange member for the remainder of the driving stroke and, upon release of said first solenoid following the severing of the tape, said retract spring causing said arm to move to its original position, thus rotating said shaft to retract said tape from the knife.

3. The device of claim 1, wherein said feeding means comprises a guide member having a ridge extending the length thereof and urged against a knurled V-shaped feed wheel, said feed wheel being interconnected with and driven by said drive shaft and shaped to substantially complement in cross-section said guide member, whereby said tape passes between the ridge of said guide member and said feed wheel so that it is propelled upward with a slight bend, giving it increased stiffness.

4. A device for severing and applying to a surface segments of pressure-sensitive tape of the type having a tacky adhesive side, comprising: a frame, a tape supply, a peripheral driving means engaging the tacky side of the tape to advance said tape, feeding means attached to said frame to guide said tape end and propel it into the path of a cut-off means; said cut-off means comprising a reciprocating ram slidable in guide means mounted on said frame, said guide means having knife means mounted thereon and adapted to receive said tape end; drive shaft means mounted through said frame and connected to said peripheral driving means; first solenoid means connected to said drive shaft to rotate said drive shaft during its power stroke; second solenoid means connected to said reciprocating ram; first switch means actuated mechanically by means connected to said first solenoid, said first switch also connected to a second switch means actuated mechanically by movement of said reciprocating ram, said second switch means connected to said first and second solenoids; and input current applied to said first solenoid whereby said first solenoid is energized to advance the tape and actuate said first switch which, in turn, actuates said second solenoid, which operates the rceiprocating ram cutting the tape off.

5. The device as set forth in claim 4, wherein the reciprocating ram continues its stroke following the tape cut-off to press the tape firmly against a desired surface and includes a retract spring connected to the ram head and the frame to return the ram to its original position.

6. The device as set forth in claim 4, wherein said reciprocating ram actuates a switch control on said second switch near the end of its stroke which releases said first solenoid, and a slip clutch on said driving shaft for providing reverse movement of said tape to release it from the knife edge.

7. A device for dispensing segments of pressure-sensitive tape of the type having a tacky side and for applying said tape segments to a surface, comprising: a supply of said tape having a free end extending therefrom; drive means engaging said tape end on its tacky side to advance said tape and remove it from said supply; a first solenoid for driving said drive means and advancing said tape a fixed amount on each stroke of said first solenoid; feed means connected with said drive means to further propel said tape into a slot; reciprocating ram means adapted to slide through said slot to sever said tape end and carry the severed tape a specified distance, whereby said tape segment is pressed against a desired surface; a second solenoid for driving said ram means; a source of current, said solenoids being connected to said source in parallel; a normally open switch in series with said second solenoid and said source of current; and means actuated by said drive means for closing said switch upon completion of the stroke of said first solenoid so as then to energize said second solenoid.

8. The device of claim 7 including a second normally closed switch connected in series with said first solenoid and by said reciprocating ram near the completion of its stroke to operate said first solenoid.

9. The device of claim 8 including slip clutch means to retract said tape upon release of the driving solenoid.

10. A device for dispensing segments of pressure-sensitive tape of the type having a tacky side and for applying said tape segments to a surface, comprising: a supply of said tape having a free end extending therefrom; drive means engaging said tape end on its tacky side to advance said tape and remove it from said supply; a first solenoid for driving said drive means and advancing said tape a fixed amount on each stroke of said first solenoid; feed means connected with said drive means to further propel said tape into a slot; reciprocating ram means adapted to slide through said slot to sever said tape end and carry the severed tape a specified distance, whereby said tape segment is pressed against a desired surface; a second solenoid for driving said ram means; a source of current, said solenoids being connected to said source of current; a switch connected to said second solenoid and said source of current; and means actuated by said drive means for actuating said switch upon completion of the stroke of said first solenoid so as then to operate said second solenoid.

11. The device of claim 7 including a second switch connected to said first solenoid and actuated by said reciprocating ram near the completion of its stroke to operate said first solenoid.

References Cited in the file of this patent

UNITED STATES PATENTS

| | | |
|---|---|---|
| 1,775,404 | Mohr | Sept. 9, 1930 |
| 2,663,444 | Kaplan | Dec. 22, 1953 |